United States Patent
Aiello et al.

(10) Patent No.: US 8,453,227 B2
(45) Date of Patent: May 28, 2013

(54) REVERSE FIREWALL WITH SELF-PROVISIONING

(75) Inventors: William A. Aiello, Vancouver (CA); Charles Robert Kalmanek, Jr., Short Hills, NJ (US); William J. Leighton, III, Scotch Plains, NJ (US); Patrick McDaniel, State College, PA (US); Subhabrata Sen, New Providence, NJ (US); Oliver Spatscheck, Randolph, NJ (US); Jacobus E. Van Der Merwe, New Providence, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1374 days.

(21) Appl. No.: 11/616,325

(22) Filed: Dec. 27, 2006

(65) Prior Publication Data

US 2007/0204338 A1    Aug. 30, 2007

Related U.S. Application Data

(63) Continuation-in-part of application No. 11/290,976, filed on Nov. 30, 2005, now abandoned.

(60) Provisional application No. 60/653,925, filed on Feb. 17, 2005.

(51) Int. Cl.
*H04L 29/06*    (2006.01)
(52) U.S. Cl.
USPC .......................................................... 726/11
(58) Field of Classification Search
USPC ..................................... 726/11; 709/224, 229
See application file for complete search history.

(56) References Cited

U.S. PATENT DOCUMENTS

| 5,835,726 A | 11/1998 | Shwed et al. |
| 5,950,195 A | 9/1999 | Stockwell et al. |
| 6,009,475 A | 12/1999 | Shrader |

(Continued)

FOREIGN PATENT DOCUMENTS

EP    0 910 197 A    4/1999

OTHER PUBLICATIONS

Emily M. Jin et. al., "The structure of growing social networks." Physics Review E, vol. 64, pp. 845, 2001.

(Continued)

*Primary Examiner* — Kambiz Zand
*Assistant Examiner* — John B King
(74) *Attorney, Agent, or Firm* — Myers Bigel Sibley & Sajovec, P.A.

(57) ABSTRACT

An application provisioning device may be used to manage a profile of a host and provide data corresponding to a selected application for installation at a host. A reverse firewall may use the profile of the host to determine whether to allow or block particular network communication from an application running on the host. An indication of a selected application may be received at the application provisioning device. Configuration information may also be received at the application provisioning device. The application provisioning server may request an update to the profile of a host and transmit such a request. The profile may be updated to reflect the configuration information and/or information of the selected application. Data corresponding to the selected application may be updated and transmitted to a host computer, where it may be installed. Therefore, the installed application running on the host may operate without being prematurely blocked by the reverse firewall.

19 Claims, 5 Drawing Sheets

U.S. PATENT DOCUMENTS

| | | | |
|---|---|---|---|
| 6,098,172 | A | 8/2000 | Coss et al. |
| 6,141,749 | A | 10/2000 | Coss et al. |
| 6,154,775 | A | 11/2000 | Coss et al. |
| 6,170,012 | B1 | 1/2001 | Coss et al. |
| 6,484,261 | B1 * | 11/2002 | Wiegel .......................... 726/11 |
| 6,510,509 | B1 | 1/2003 | Chopra et al. |
| 6,529,938 | B1 * | 3/2003 | Cochran et al. .............. 709/203 |
| 6,609,196 | B1 | 8/2003 | Dickinson, III et al. |
| 6,826,694 | B1 | 11/2004 | Dutta et al. |
| 6,954,790 | B2 | 10/2005 | Forslow |
| 7,069,330 | B1 * | 6/2006 | McArdle et al. ............. 709/229 |
| 2002/0133586 | A1 | 9/2002 | Shanklin et al. |
| 2003/0107988 | A1 * | 6/2003 | Lodha et al. .................. 370/229 |
| 2004/0068559 | A1 * | 4/2004 | Shaw .......................... 709/224 |

OTHER PUBLICATIONS

Ravi Kumar et al., "The web and social networks," IEEE Computer, vol. 25, No. 11, pp. 32-36, 2002.

J. Kleinberg, "The Small-World Phenomenon: As Algorithmic Perspective," in Proceedings, 32nd ACM Symposium on Theory of Computing, 2000 pp. 163-170.

J. Kleinberg, "Navifation in a small world," Nature, vol. 405, pp. 845, 2000.

Godfrey Tan et al., "Role Classification of Hosts with Enterprise Networks Based on Connection Patterns," in Proceedings of 2003 USENIX Annual Technical Conference, Jun. 2003, pp. 15-28, San Antonio, TX.

Corina Cortes, Daryl Pregibon and Chris T. Volinsky, "Communities of interest," Intelligent Data Analysis, vol. 6 No. 3, pp. 211-219, 2002.

Chuck Cranor et al., "Gigascope: a stream database for network applications," in Proceedings of ACM SIGMOD, Jun. 2003.

Mirage Networks Inverted Firewall retreived from http://www.apliednetsec.com, Oct. 27, 2005.

MANAnet™ Firewall—Product Sheet-, retrieved from http://www.cs3-inc.com/ps_fw.html, Oct. 27, 2005.

MANAnet™ FloodWatcher™: Passive, Offline, DDoS, Attack Detection, Alerts and Attribution—Product Sheet retrieved from http://www.cs3-inc.com/floodwatcher.html, Oct. 27, 2005.

MANAnet™ Reverse Firewall™: Fighting DDoS Attacks at Their Origins—Product Sheet retrieved from http://www.cs3-inc.com/ps_rfw.html, Oct. 27, 2005.

MANAnet™ Router: A Working Defence Against DDoS Attacks—Product Sheet retrieved from http://www.cs3-inc.com/ps_router.html, Oct. 27, 2005.

MANAnet™ Sheild: A Systemic Solution to DDoS Attacks—Product Sheet retrieved from http://www.cs3-inc.com/ps_shield.html, Oct. 27, 2005.

Donald Cohen and K. Narayanaswamy, "A Fair Service Approach to Defending Against Packet Flooding Attacks", retrieved from http://www.cs3-inc.com on Oct. 27, 2005.

Edward Hurley, "Firewall protection—in reverse" Jan. 15, 2002 retrieved from http://www.searchsecurity.com on Oct. 27, 2005.

Cs3 Inc., "Defending Government Network Infrastructure Against Distributed Denial of Service Attacks" retrieved from http://www.cs3-inc.com on Oct. 27, 2005.

Cs3 Inc., "Towards a More Secure and Robust Internet" retrieved from http://www.cs3-inc.com on Oct. 27, 2005.

Cs3 Inc., "The Reverse Firewall" Defeating DDoS Attacks Emanating from a Local Area Network retrieved from http://www.cs3-inc.com on Oct. 27, 2005.

Donald Cohen, K. Narayanaswamy and Fred Cohen "Changing IP to Eliminate Source Forgery" retrieved from http://www.cs3-inc.com on Oct. 27, 2005.

Phillip Hallam-Baker, Special to ZDNet, "The New Face of Cybercrime", Jul. 21,2004 retrieved from http://www.zdnet.com.au/insight/security/soa/The new face of cybercrime/0,39023764,39154033,00.htm on Oct. 27, 2005.

Mike Chen, Barbara Holt and Tal Lavian, "Popeye, Using Fine-grained Network Access Control to Support Mobile Users and Protect Intranet Hosts" pp. 1-8, Dec. 11, 2000.

Barbara Holhlt, Mike Chen and Tal Lavian, "Reverse Firewall—Protecting Intranets from Insiders" —CS294-1—Wireless Mobile Computing retrieved from http://www.cs.berkeley.edu/~hohltb/program_router/prisonwall.html, Oct. 28, 2005.

Mirage Networks—Product Overview retrieved from http://www.miragenetworks.com/p_index.html, Oct. 28, 2005.

Mirage Networks—Features retrieved from http://www.miragenetworks.com/p_features.html, Oct. 28, 2005.

Mirage Networks—Deployment retrieved from http://www.miragenetworks.com/p_deployment.html, Oct. 28, 2005.

Mirage Networks—FAQ retrieved from http://www.miragenetworks.com/p_faq.html, Oct. 28, 2005.

Staff Writer, "Inverted Firewall Prevents Rapidly Propagating Worms and Viruses", Security Pro News, Oct. 7, 2004 retrieved from http://securitypronews.com/news/securitynews/spn-45-20041007Inverte . . . , Oct. 28, 2005.

Washington Technology, "Network security doesn't stop at the perimeter," Post-Newsweek Media, Inc. 1996-2005 retrieved from http://www.washingtontechnology.com/cgi-bin/udt/im.display, Oct. 28, 2005.

Mirage Networks, Austin, "Round Rock ISD Achieves Pervasive Internal Network Security with Mirage Networks" retrieved from http://www.internetadsales.com/modules/news , Oct. 28, 2005.

James Middleton, "Reverse firewall dams DoS flood," nvunet.com Nov. 2, 2001 retrieved from http://www.vnunet.com/articles, Oct. 28, 2005.

Security Risk: View topic—Slowing Down Internet Worm using Tarpits retrieved from www.SecurityRisk.org, Oct. 31, 2005.

jfulmer@appin.ml.org, "Reverse firewall connections," Nov. 11, 1998 retrieved from http://www.realvnc.com/pipermail/vnc-list/1998-November /003403.hml, Oct. 28, 2005.

Don Cohen and K. Narayanaswamy, "Survey/Analysis of Levels I, II, and III Attach Attribution Techniques," Cs3 Inc., Apr. 27, 2004.

Newton's Telecom Dictionary, pp. 111-834, et al., 2002 Harry Newton.

Mirage Networks—Key Differenetiators retrieved from http://www.miragenetworks.com/p_keydifference.html, Oct. 28, 2005.

Canadian Exam Report (3 pages) corresponding to Canadian Patent Application No. 2,533,034; Dated: Jul. 6, 2009.

* cited by examiner

REVERSE FIREWALL WITH SELF-PROVISIONING

This application is a continuation-in-part of U.S. application Ser. No. 11/290,976, entitled "Determining Firewall Rules For Reverse Firewalls" filed Nov. 30, 2005, which claims priority to U.S. Provisional Application No. 60/653,925, entitled "Determining Firewall Rules For Reverse Firewalls" filed Feb. 17, 2005; the disclosure of both aforementioned applications are expressly incorporated herein by reference in their entirety.

TECHNICAL FIELD

Aspects of the invention relate to a method and/or device for improving the protection and management of hosts in an internal network. For example, aspects of the invention relate to techniques for generating, maintaining, and enforcing a communications management policy in a network.

BACKGROUND

The outbreak of the worms taking advantage of vulnerabilities in commercial desktop security software has highlighted the need for multi-faceted security measures. Perimeter defenses (e.g., conventional firewalls) are only marginally effective in suppression of worms because of the difficulty of defining and implementing these types of systems. Enterprise networks, in particular, are at risk from a deficiency in security against worms. For example, once a worm is in a company's internal network, it can spread to other internal computers even if they are completely isolated from the Internet. Furthermore, worms may be introduced into a company's internal network by laptops that are used both outside and within the enterprise.

Therefore, there is a need in the art for a method and/or device for protecting against worms and other security threats within enterprise networks, and generally, data networks. There is also a need in the art for a method or device for protecting a host in an internal network from other hosts in that same network in a brownfield and greenfield environment. In addition, there is a need in the art for a device to enhance the installation and/or configuration process for applications on this network.

SUMMARY

Disclosed herein is a method for securing a network using a reverse firewall that accesses a profile of an internal host. In one embodiment, the reverse firewall may receive communication from an internal host, and may, if the communication from the host is in-profile, allow the communication to pass. Else, if the communication from the host is out-of-profile, the reverse firewall may enforce a throttling discipline on the communication to determine whether to allow or block the communication. Some examples of throttling disciplines in accordance with the invention include, but are not limited to, n-r-relaxed, n-r-strict, and n-r-open.

In addition, disclosed herein is a method for determining a communications management policy for a reverse firewall in a network. In one embodiment, a profile may be generated and updated for an internal host. The reverse firewall may set a throttling discipline designated for out-of-profile communication from the host. The profile of an internal host may comprise an initial set of rules based on an analysis of communication between a plurality of hosts during a learning period.

Also disclosed is a method for managing a profile of a host in accordance with various embodiments of the invention. In one embodiment, an indication of a selected application may be received at a computing device. In addition, configuration information may be received at the computing device. The computing device may transmit a request to update the profile of a host to reflect the configuration information and/or information of the selected application. Data corresponding to the selected application may be updated and transmitted to a host computer, where it may be installed. A reverse firewall may use the updated profile of the host to determine whether to allow or block particular network communication from the application on the host. In one embodiment, an apparatus comprising a memory and processor may perform aspects of the method.

Furthermore, disclosed herein is a reverse firewall for controlling communication sent from an internal host. The reverse firewall may be implemented in a network device configured to enforce a profile and a throttling discipline, and comprising a memory unit and an out-of-profile counter.

BRIEF DESCRIPTION OF THE DRAWINGS

One or more embodiments of aspects of the invention are illustrated by way of example and not limited in the accompanying figures in which like reference numerals indicate similar elements and in which.

DETAILED DESCRIPTION

A reverse firewall in accordance with aspects of the invention may improve the protection of the hosts within a network against worms and similar security threats. The reverse firewall may generate, maintain/update, and enforce a profile of a host in the network to protect other internal hosts from that host. In addition, a reverse firewall may enforce a throttling discipline (TD) to determine whether to allow or block network communication from a host. The management of the reverse firewall may be enhanced through methods and/or apparatuses for generating and/or updating the profile of a host. These and other aspects of the invention will become apparent to one skilled in the art after review of the entire disclosure and any disclosures incorporate by reference herein.

Figure 1:
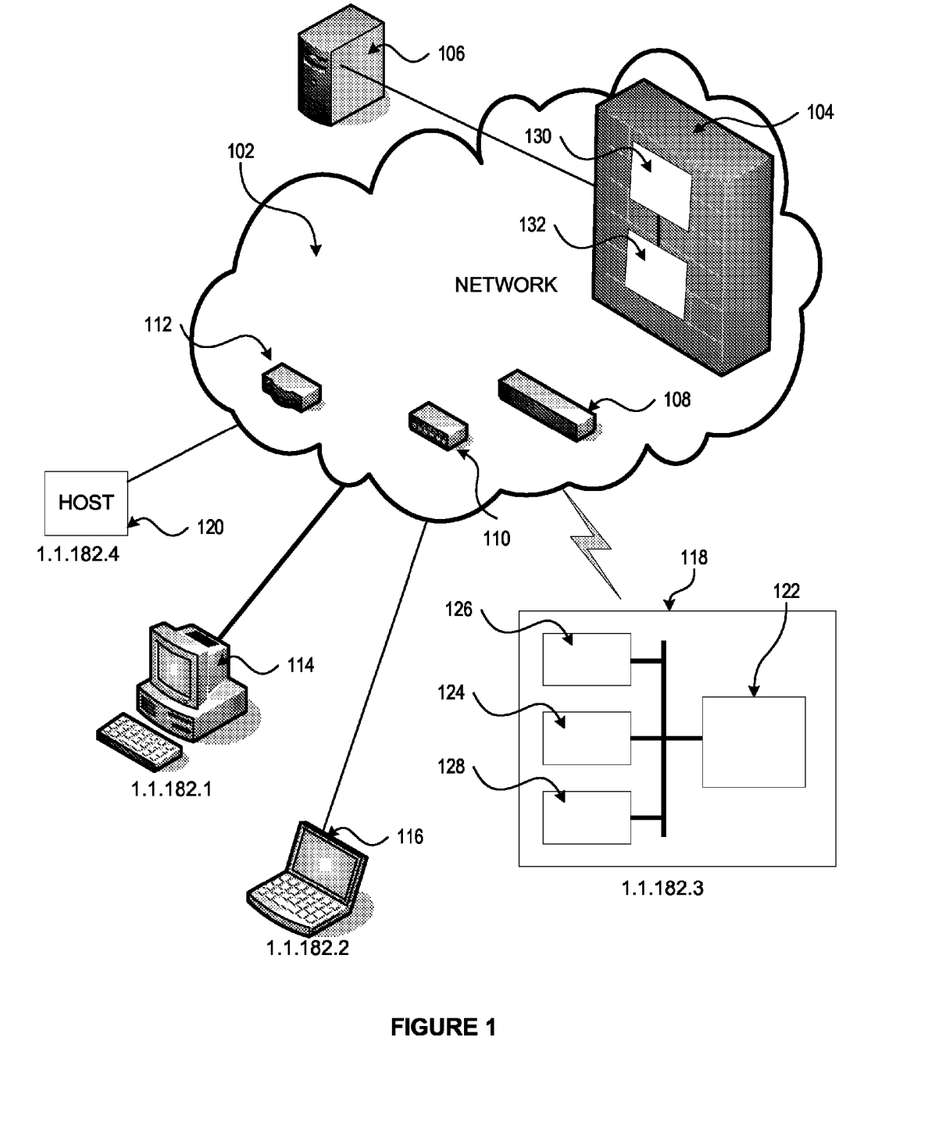
FIG. 1 shows an illustrative operating environment for various aspects of the invention.

FIG. 1 illustrates an example of a suitable network architecture in which aspects of the invention may be implemented. The network architecture is only one example of a suitable network layout and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, networked PCs, minicomputers, mainframe computers, distributed computing environments that include any of the above systems or devices, and the like. In addition, one of more network devices (e.g., host 118) may be connected to the network 102 through wireless communication, such as IEEE 802.11, Wi-fi, radio frequency (RF), and bluetooth. One skilled in the art will understand that a network device need not be directly connected to a network 102 to be considered connected in accordance with aspects of the invention. The term, connected, shall not require a device to be directly connected. Furthermore, an external host 106 may be connected to a conventional firewall 104 of the network 102. The external host 106 may receive communication from and send communication to internal hosts 114, 116, 118, 120.

One skilled in the art will appreciate that aspects of the invention may be described in the general context of computer-executable instructions, such as program modules, executed by one or more computers or other network devices. Generally, program modules may include routines, programs, objects, components, data structures, etc. that perform particular tasks or implement particular abstract data types. Typically the functionality of the program modules may be combined or distributed as desired in various embodiments. Suitable network architecture may include at least some form of computer readable media. Computer readable media can be any available media that can be accessed by computers or other devices.

A reverse firewall in accordance with aspects of the invention may be used to secure a network 102 of hosts 114, 116, 118, 120. The reverse firewall may be embodied in any network device connected to the network 102. For example, a router 112, hub 110, switch 108, and/or conventional firewall 104 may be configured to act as (or work in combination with another device to act as) a reverse firewall. In one illustrative embodiment of aspects of the invention, a router 112 may be a programmable router comprising a memory unit, and configured as a reverse firewall. In another embodiment, the reverse firewall may be integrated into an Ethernet switch 108 that is located between an internal host 114 and that host's connection to a network 102. This may permit, among other things, the Ethernet switch 108 to regulate network communication originating from internal host 114. In another example, a reverse firewall may be implemented as a software module in a computing machine (e.g., host 120) comprising a computer-readable medium storing computer-executable instructions as described in this disclosure. The computing machine 120 may be located between an internal host 114 and its connection to the network 102 (e.g., network switch 108, etc.) Such a network configuration is similar to a bump-in-the-wire approach, as it would be understood by one of skill in the art after review of the entirety disclosed herein. In yet another embodiment, the computing machine 120 comprising a software module, as described above, may be designed such that it has a secure communications co-processor with a separate operating system from that supporting the other applications on the computing machine 120. At least one benefit of such a configuration is a reduced security risk that a virus, worm, or other malicious code infiltrates the functionality of the reverse firewall.

The reverse firewall device may be coupled to a host (e.g., a policy manager implemented as or implemented in a computing host 118) that provides profile information that the reverse firewall device may use to regulate the network communication from hosts 114, 116, 118. The policy manager 118 may be configured to generate the profiles of the hosts on the network 102, save those profiles, update those profiles, and provide those profiles (or information relating to those profiles) to an authorized reverse firewall device (or other device and/or software module acting as such a device). Alternatively, the policy manager 118 may be implemented as software-implemented module executing in a computing host 118. One skilled in the art will understand that coupled components need not be directly connected to be considered connected in accordance with aspects of the invention. The term, connected, shall not require a device to be directly connected.

In accordance with aspects of the invention, an illustrative computing device 118 may be configured to receive an indication of a selected application and transmit a request to update a profile of a host to reflect configuration information of the selected application. In one embodiment, the illustrative computing device 118 may comprise of a memory 124, processor 122, output device 126, and/or input device 128. A processor 122 may be a conventional processor that can execute computer-executable instructions stored in a memory 124. A memory 124, which may be volatile and/or non-volatile, may be configured to store data corresponding to an application choice and computer-executable instructions. Examples of data corresponding to an application choice include, but are not limited to, executable files, text files, graphics files, configuration files, database files, install files, compressed files, and any other information comprising a software application. For example, the illustrative computing device 118 may be a server computer, such as a provisioning server 118, coupled to a network 102 (e.g., through an Ethernet card, analog modem, or other communications unit) and with adequate storage capacity to hold data corresponding to one or more software applications. Such a provisioning server 118 may comprise a processor to execute the computer-executable instructions for performing a method in accordance with aspects of the invention. In this example, the provisioning server 118 may be configured for use as an enhanced device for downloading software applications (including upgrades or patches of software applications) to hosts.

In another embodiment, the illustrative computing device may be a conventional computer storing computer-executable instructions in its memory and storing data corresponding to an application choice on a CD-ROM, DVD, or other memory store coupled to an input/output (I/O) port of the computer. The processor in the conventional computer may be used to execute the computer-executable instructions for performing a method in accordance with aspects of the invention. A computer monitor and keyboard coupled to the computer may be used as an output and input device, respectively. Examples of how to make and use this and other embodiments is further described in detail below.

The illustrative computing device 118 in FIG. 1 is depicted as being located on the internal network. However, the device 118 may also be located on the external network (e.g., like device 106). The device 118 may be placed on the internal network for various reasons, including but limited to, added security from external hackers and closer proximity of the device to internal users (e.g., information technology (IT) staff). These and other aspects of the illustrative computing device in accordance with aspects of the invention will be apparent to one skilled in the art after thorough review of the entirety disclosed.

Figure 3:
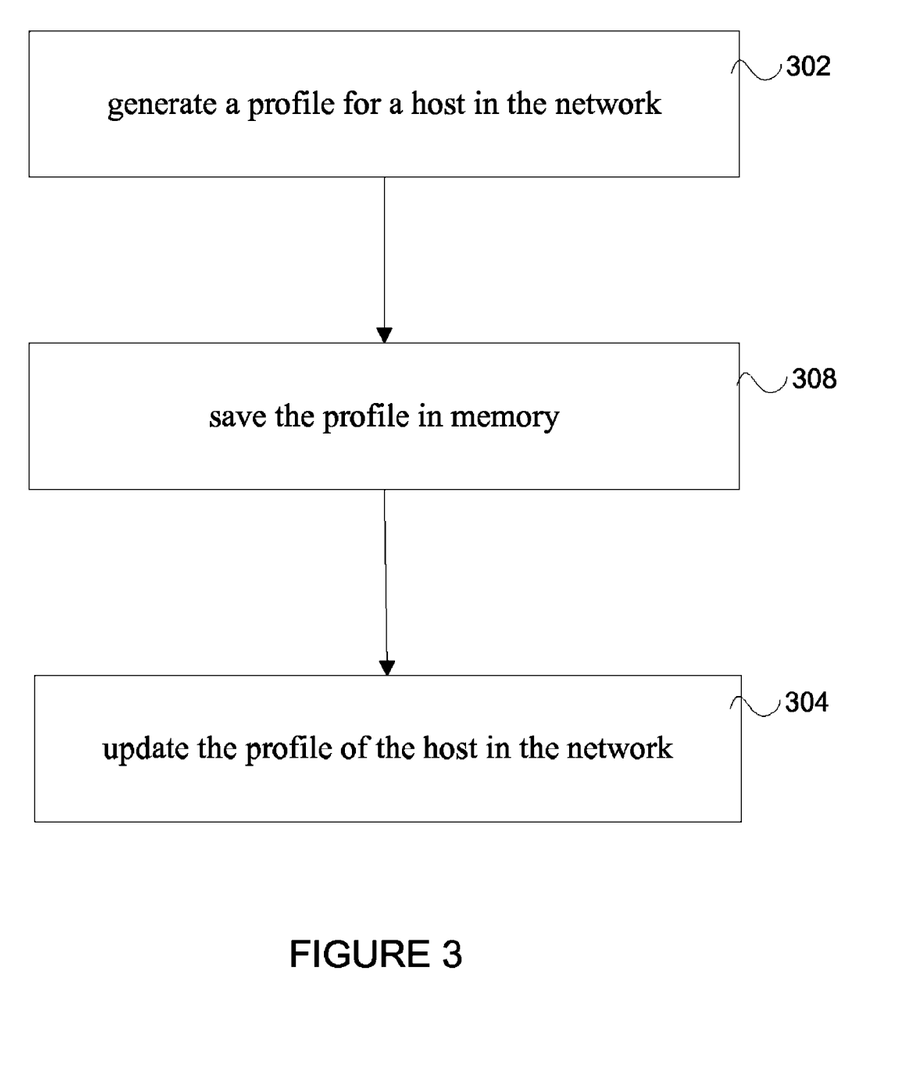
FIG. 3 illustrates a flowchart of a method for determining a policy for a reverse firewall in accordance with various embodiments of the invention.

FIG. 3 depicts a flowchart of a method for determining a communications management policy for a reverse firewall in a network. The communications management policy determines, among other things, when to drop or pass packets sent from an internal host in the network. In one example, the reverse firewall may use a profile comprising a set of rules to implement aspects of the communications management policy. The set of rules may be used to determine when to drop or pass packets sent from an internal host in the network.

The profile for an internal host 114 in the network may be generated (in step 302) by, for example, a policy manager and used by a reverse firewall to determine whether to allow or block network communication from an internal host 114. In one embodiment, a profile for an internal host 114 may be generated at a network device (e.g., router 112) that is being used as a reverse firewall in accordance with aspects of the invention. In an alternative embodiment, a computing machine 120 on the network may be configured to, among other things, collect and/or analyze desirable information for use in generating a profile of an internal host 114. The computing machine 120 may monitor communication (i.e., traffic) on a network 102 during a predetermined length of time (i.e., a learning period) to generate a profile of internal hosts and provide the profiles (or information relating to the profiles) to a reverse firewall. Such a computing machine 120 may be referred to as a traffic collector and/or analyzer.

Figure 4:
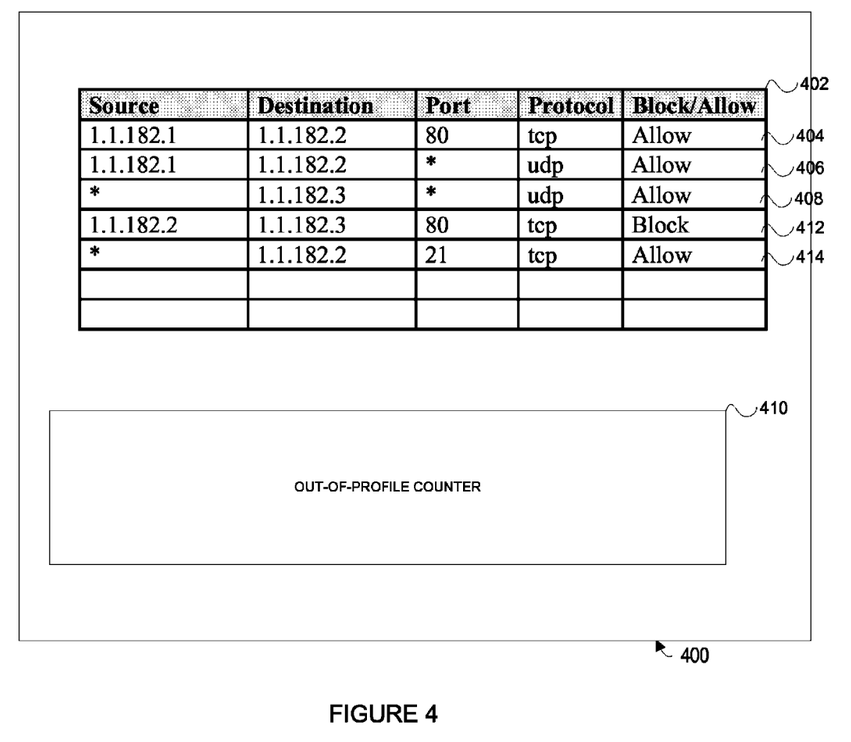
FIG. 4 illustrates a memory unit in a reverse firewall in accordance with various embodiments of the invention.

The interaction between the internal hosts on the network 102 may define a community of interest. For example, the computing machine 120 may analyze flow records of the network 102 to extract information about internal host communication (e.g., source IP address, destination IP address, destination port number, communication protocol, etc.) and generate an initial set of rules corresponding to the network communication between a plurality of hosts in the network. These initial set of rules may be used to generate a profile of a host 114 on the network 102. The profile of a host 114 may comprise PCSPP rules (i.e., a 3-tuple rule defined by protocol, client, server port, and server profile), PCSP rules (i.e., a 3-tuple rule defined by protocol, client, and server profile), PSP rules (i.e., a 2-tuple rule defined by protocol and server profile), and/or PSSP rules (i.e., a 3-tuple rule defined by protocol, server port, and server profile). One skilled in the art will appreciate that other combinations of information about internal host communication, including but limited to source IP address, destination IP address, destination port number, and communication protocol, may be used for other types of rules. For example, a rule 412 may comprise source IP address, destination IP address, destination port number, and communication protocol. The invention shall not be limited in any way to an example expressly disclosed above; rather, aspects of the invention embody all compatible combinations operatively possible given information about internal host communication.

In accordance with aspects of the invention, it may be desirable to identify a core community of interest (i.e., core COI) for each relevant internal host. The core COI may be of a popularity community of interest (i.e., popularity COI) type, frequency community of interest (i.e., frequency COI) type, and/or a combination thereof. It will be apparent to one skilled in the art after review of the entirety disclosed herein, including any disclosure incorporated by reference, that the analysis of network communication in a community of interest contributes to the generation of an initial set of rules for internal hosts on a network.

In one example, in step 302, an initial set of rules corresponding to communication originating from a host may be generated based on an analysis of the network communication between a plurality of hosts in the network during a learning period. During the learning period, the traffic on the network 102 may be monitored to generate a set of initial rules. For example, a set of rules for a profile may be generated based on data analyzed during a learning period to identify those destination-port pairs that have substantial amounts of traffic on the network 102. For any source hosts communicating with the destination-port pair (e.g., a port on the destination host) a rule may be added to the profile of the source host. In yet another example, a rule may be added to a source host's profile to allow all communication from a source host to all ports on a destination host (e.g., by designating the port as a wildcard in the rule, by leaving that attribute of the rule blank, etc.).

The analysis of network communication may begin with a two-dimensional clustering model, where the number of connections per port may be shown on one axis, while the number of destination hosts using that port may be shown on another axis. Then, using a k-means statistical clustering technique known in the art, those ports with substantially more traffic may be partitioned from other ports on the network 102 in an iterative process. The k-means technique may use randomly selected centroid locations, therefore, in one example, the k-means technique may be repeated multiple (e.g., one hundred) times with different centroid locations to determine the solution with the lowest value for the sum of within-cluster point-to-centroid distances. The k-means technique may result in two distinct clusters: the first cluster corresponding to points clustered around low values of number of connection and number of destination hosts, and the second cluster comprises points that have high values along these dimensions. Thus, the points of the second cluster may be selected as ports for the transport protocol (e.g., TCP, UDP, etc.) being considered. This information may be used in generating PCSPP rules, PCSP rules, PSP rules, and/or PSSP rules. Moreover, one skilled in the art will appreciate that log transformation (i.e., transforming the data value for each variable to a logarithmic scale to reduce the effect of outliers at the high end of the value range) and scale standardization (e.g., z-score normalization where variables are normalized on a common scale to avoid one variable from dominating the other in the cluster) may be used in addition to k-means techniques.

Alternatively, in step 302, an initial set of rules for a profile of a host may be generated based on the software applications installed (including those selected to be installed) on the host. For example, a host 114 machine purchased from a retailer may be shipped with limited or no software applications pre-installed. In accordance with various aspects of the invention, installed applications include applications locally present on a host 114 machine, applications that are present on a different machine and downloaded at execution, and other applications that are available to a user of host 114 machine through other means.

When host 114 is added to the internal network 102, network communication sent from the host 114 may be monitored by a reverse firewall device 104 coupled to the host 114. The illustrative reverse firewall device 104 may attempt to access the profile for the host 114. If parameters of the network communication from the host 114 are in the profile of the host 114, the reverse firewall device 104 may allow the network communication to pass through the device and on to its destination. Meanwhile, if the parameters of the network communication from the host 114 are not in the profile of the host, the reverse firewall device 104 may enforce a throttling discipline on the network communication to determine whether to allow or to block the network communication from the host 114. These and other aspects of the invention are discussed in greater detail throughout the disclosure.

In one example in accordance with various aspects of the invention, the profile for the host may be empty when the host 114 is first connected to the internal network 102. In one example, the profile of the host 114 may be initially configured to allow the host 114 to communicate only with a policy manager 118. Once the software applications installed on the host 114 are determined, the profile of the host 114 may be automatically generated based on this information. For example, users of a host 114 may be permitted to select one or more software applications to be installed and/or running on the host 114 from a pre-approved set of applications. These applications may be pre-approved because, for example, they do not pose a security threat to the network. A policy manager 118 may automatically update the saved profile of the host 114 based on the application selected and installed/executed.

In another embodiment in accordance with aspects of the invention, the profile of the host may be updated (in step 304) based on an analysis of network communication between a plurality of hosts in the network 102 during a period of time. For example, sample network communication automatically collected at regular two hour intervals, for example, may be analyzed and used to update the profile of the host. At least one advantage of this illustrative embodiment is that the profile of the host remains current over time such that the reverse firewall is able to appropriately regulate network traffic.

In yet another embodiment in accordance with aspects of the invention, the profile of the host 114 may be updated (i.e., generated in the situation where the profile for the host is empty) in response to receiving a request to update the profile of the host to reflect configuration information of a selected application. Examples of configuration information of an application include, but are not limited to, information (e.g., IP address, network name, etc.) indicating a host (e.g., internal host, external host, etc.) that the application choice is configured to access and/or designation of one or more ports on a machine for use by the application. One skilled in the art will appreciate that there are many other examples of configuration information that may be used in accordance with aspects of the invention. In addition, the request to update the profile of the host may be transmitted, for example, from a computing device 118 containing computer-executable instructions in accordance with various aspects of the invention. The request to update the profile of a host may comprise one or more rules (e.g., PCSSP rule, PCSP rule, PSP rule, PSSP rule, and/or other type of rule), information for generating a rule, and/or other information sufficient to update the profile of the host to reflect configuration information of a selected application.

The profile generated (in step 302) may comprise at least one of: PCSPP rule, PCSP rule, PSP rule, PSSP rule, and other types of rules disclosed throughout. The profile is saved (in step 308) in a memory (e.g., memory 130, memory 124, etc.) in communication with a processor (e.g., processor 132) that is located in a policy manager 118. The memory where the profile is stored may be located anywhere accessible to a processor in a policy manager. The policy manager 118 may provide the saved profile information to a reverse firewall device 104. Alternatively, the profile manager may be integrated into part of the reverse firewall device 104. One skilled in the art will appreciate that a secure memory area may be desirable over an unsecured memory area in various embodiments of the invention.

Once the initial set of rules has been generated, in step 304 these rules may be updated, for example, using a synchronization/communication protocol. The set of rules may be automatically updated to accommodate for known undesirable network communication. For example, it may be desirable to remove any rules in a profile corresponding to TCP communication between two internal hosts that consists of less than three packets in each direction. In another example, it may be desirable to remove any rules in a profile corresponding to UDP communication between two internal hosts that consists of less than two packets in either direction. In yet another example, it may be desirable to not remove any rules corresponding to ICMP data communication. One skilled in the art will appreciate that other updates to the profile of internal hosts are envisioned in accordance with aspects of the invention. For example, as explained above, the rules in a profile may be updated to reflect new software applications installed/running on or uninstalled from a host computer on the network 102. In various embodiments, a network administrator (or similar authorized user with sufficient security credentials) may be permitted to access a policy manager 118 to review, create, delete, and/or modify/update profiles of hosts. The network administrator may access the policy manager 118 using an interface similar to a security management console. One of skill in the art will, after review of the entirety disclosed herein, appreciate that the interface may comprise sufficient functionality to permit the desired extent of access/update.

In various embodiments of the invention, it may be desirable for the communications management policy for a reverse firewall to comprise a profile of the internal hosts and/or a throttling discipline (TD). A reverse firewall may set a TD for out-of-profile network communication from an internal host. In one example, the TD may be used to describe the tolerable rate of out-of-profile communication from an internal host and the action for a reverse firewall device 104 to take when the rate is exceeded. After review of the entirety disclosed herein, one skilled in the art will appreciate that various throttling disciplines are available for use with a reverse firewall.

Figure 2:
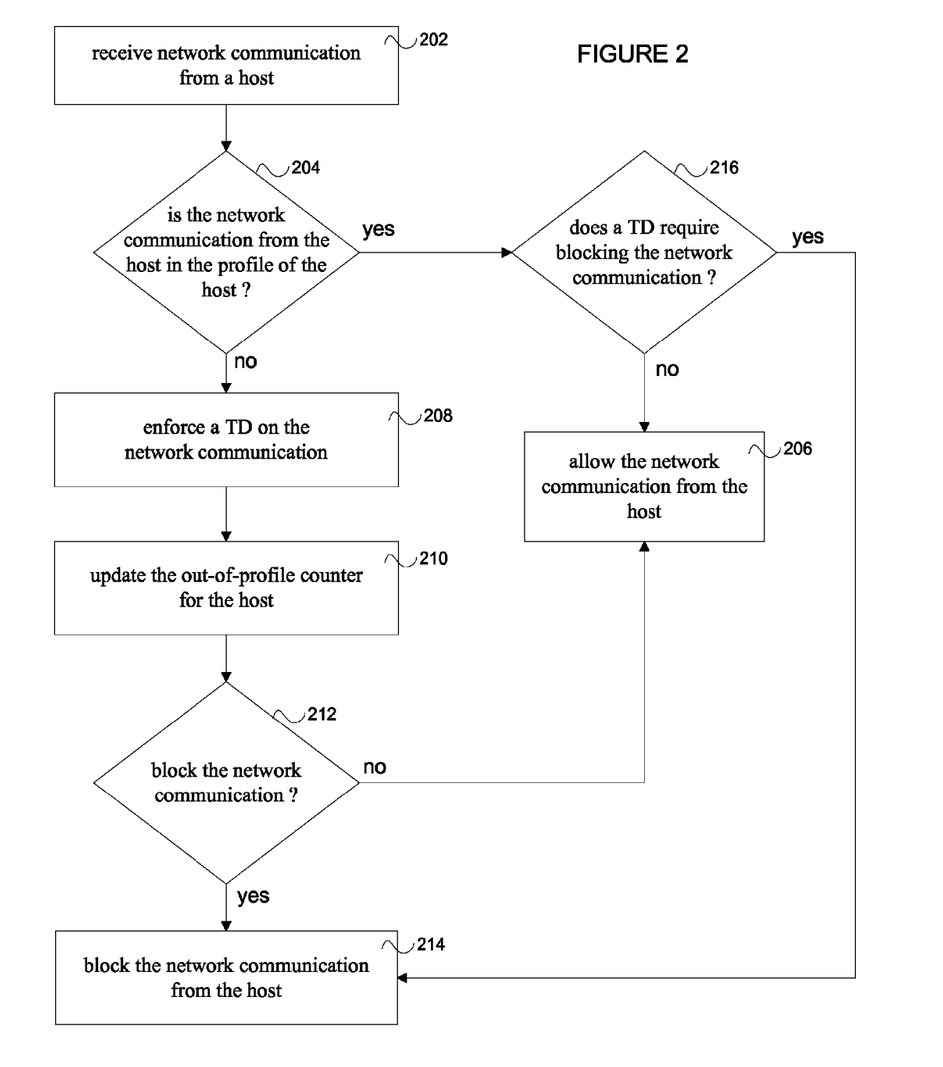
FIG. 2 depicts a flowchart of a method for securing a network using a reverse firewall in accordance with various embodiments of the invention.

In accordance with aspects of the invention, FIG. 2 depicts a flowchart of a method for securing a network from a host using a reverse firewall. In the illustrative embodiment depicted by FIG. 2, the reverse firewall may be embodied in a network device such as router 112 located on the network 102 and storing a profile of a host 114. The profile of a host 114 comprises a set of rules defining the internal exchange of network packets between that host 114 and other hosts (116, 118, and 120) in the network 102. The profile of a host 114 is discussed in greater detail in relation to the description of FIG. 4 below.

In step 202, the reverse firewall receives network communication from an internal host 114 (i.e., a host on the internal network 102). The network communication may be the result of an application (e.g., a web browser, instant messenger, etc.) running on the internal host 114. One skilled in the art will recognize that network communication may include any communication between devices on a network. For example, an internal host 114 may be running a telnet program that is exchanging information with another internal host 116 on port 23 using transmission control protocol (TCP). The network communication may also occur using protocols, such as user datagram protocol (UDP), Internet control message protocol (ICMP), dynamic host configuration protocol (DHCP) and other protocols apparent to those skilled in the art. In some embodiments, the reverse firewall may be configured to allow or block network communication based on at least the protocol being used. For example, a reverse firewall may be configured to not block any DHCP traffic from internal hosts. These and other embodiments of aspects of the invention will become apparent to one skilled in the art after review of the entire disclosure.

In step 204, the reverse firewall accesses the profile corresponding to the internal host 114 that is the source of the network communication (i.e., internal source host) to determine if the parameters of the network communication (e.g., destination address, destination port, and/or communication protocol) are present in the profile of the internal source host 114. Parameters of network communication include, but are not limited to, destination address, destination port, and communication protocol. If the destination host (i.e., the host corresponding to the destination address) parameter is included in the profile of the internal source host 114, then the network communication from the internal source host 114 to the destination host may be allowed to pass. In addition, if the profile of the internal source host 114 includes information about a port or range of ports on the destination host, then the reverse firewall may also consider the destination port parameter of the network communication in allowing (or blocking) the network communication. Moreover, if the profile of the internal source host 114 includes information about communication protocol, then the reverse firewall may also consider the protocol parameter of the network communication in allowing (or blocking) the network communication. In one embodiment, network communication from a host is in the profile of that host if the destination address (e.g., IP address of the destination host) parameter, destination port (e.g., port 23) parameter, and communication protocol (e.g., UDP) parameter are present in the profile of the host. One skilled in the art will appreciate that numerous variations and/or combinations of the exemplary items (e.g., address, port, protocol, allow/block status, etc.) that may appear in a rule of a profile are envisioned in accordance with aspects of the invention.

In an example in accordance with aspects of the invention, an internal source host 114 attempts to send network communication to port 23 of an internal destination host 116 using UDP. The reverse firewall may access the profile corresponding to the internal source host 114 to determine if UDP communication from the internal source host 114 to port 23 on the destination host 116 is allowed in the profile. In one example, assuming the profile contains a rule (or set of rules) allowing UDP communication from the source host 114 to port 23 on the destination host 116, the communication may be allowed (in step 206) to be sent to the destination host 116. In another example, assuming the profile contains a rule (or set of rules) allowing UDP communication from the source host 114 to any port on the destination host 116 (e.g., the port is a wildcard, port is not an item in the profile, etc.), the network communication may be allowed (in step 206) to be sent to the destination host 116. One skilled in the art will appreciate that numerous variations and combinations of the above examples of profile rules (or set of rules) are envisioned in accordance with aspects of the invention.

On the other hand, if the network communication from the source host 114 is not in the internal source host's profile (i.e., it is out-of-profile network communication), the reverse firewall may consider additional factors in determining whether to allow or block the network communication from the source host. For example, the reverse firewall may be configured to enforce a throttling discipline (TD) on the network communication (in step 208). A throttling discipline may be used, among other things, to control out-of-profile network communication from a host. Examples of throttling disciplines include, but are not limited to, a n-r-relaxed discipline, a n-r-strict discipline, a n-r-open discipline, combination and/or derivations of these disciplines, and/or other throttling disciplines that will be apparent to one skilled in the art after review of the entire disclosure herein.

For example, a n-r-strict throttling discipline blocks all communication, both out-of-profile and in-profile, from an internal host after the number of out-of-profile communications from that internal source host exceed a threshold 'n' within a time period 'r'. Thus, out-of-profile communication is not necessarily always blocked. In one example in accordance with various aspects of the invention, a reverse firewall is enforcing a n-r-strict throttling discipline where the value of 'n' is zero. Therefore, all network communication from an internal source host is blocked when an out-of-profile network communication is attempted by the internal source host. A reverse firewall enforcing such a TD might not require a value for 'r'. A n-r-strict discipline with the value of 'n' as zero may result in a highly secure internal network 102 where no out-of-profile communication is allowed.

The number of out-of-profile communications may be measured by the number of out-of-profile packets or some other measurable unit that will be apparent to one skilled in the art. For example, flow records (e.g., records generated by some Cisco routers when 'netflow' is enabled) grouped into, e.g., 5-minute intervals, may be used to determine the number of out-of-profile communications. Similarly, the packet tracking feature on some routers may be used to measure the number of out-of-profile communications. Furthermore, an out-of-profile counter may be used to track the number of out-of-profile communications sent from an internal host during a time period 'r' (e.g., 10 minutes). In an illustrative embodiment, an out-of-profile counter in a reverse firewall may be provided for each host in the internal network 102. When the network communication from an internal host is not in the profile of that host, (in step 210) the out-of-profile counter may be updated, e.g., by incrementing a numeric counter in the out-of-profile counter. The out-of-profile counter is discussed in greater detail in relation to the description of FIG. 4 below.

Another example of a throttling discipline includes a n-r-relaxed discipline that allows an internal host to send 'n' out-of-profile communications within a time period 'r'. If the number of out-of-profile communications exceed a threshold 'n' within a time period 'r', all future communication (both in-profile and out-of-profile) from the internal source host is blocked. When the value of 'n' in an n-r-relaxed throttling discipline is zero, the throttling discipline behaves the same as a n-r-strict discipline with the value of 'n' as zero. In addition, an out-of-profile counter may be used with this TD similar to that discussed earlier.

Yet another example of a throttling discipline includes a n-r-open discipline that allows a threshold of 'n' out-of-profile communications within a time period 'r'. Under this TD, once the threshold has been reached, the reverse firewall blocks all out-of-profile communications from the internal source host. The reverse firewall, however, does not block any of the communication that is in-profile in an n-r-open discipline. In addition, an out-of-profile counter may be used with this TD similar to that discussed earlier. At least one benefit of an n-r-open discipline is the ability for an internal host to continue to function by communicating with other hosts in its profile even after the threshold has been reached. Thus, an internal host may still able to operate a reduced number of network applications.

In some throttling disciplines, once a threshold has been reached, a network administrator or operator may be required to manually reset the out-of-profile counter corresponding to the internal host. In an alternative embodiment in accordance with aspects of the invention, a user of the internal source host may be presented with a pop-up dialog box on a visible display screen where the user may authorization the reset of the out-of-profile counter for that host. One skilled in the art will appreciate that in some industries, e.g., banking, that are required to enforce high standards of network security, a pop-up dialog box may be less desirable than a manual reset by an administrator. In another embodiment, the user may be able to use the pop-up dialog box to update the profile of the host to include a rule (or set or rules) for the network communication at issue.

In another example in accordance with aspects of the invention, even if the profile contains a rule (or a set of rules) allowing the communication between a source host 114 and a destination host 116 (in step 204), the reverse firewall may still block the communication. The reverse firewall may enforce a throttling discipline (TD) to determine (in step 216) whether to allow or block the in-profile communication from the source host 114. For example, in a reverse firewall enforcing a TD of n-r-relaxed discipline, once the 'n' value has been exceeded within a time period 'r', all future communication, including both in-profile and out-of-profile communication, from the host is blocked (in step 214). In another example involving a reverse firewall enforcing a TD of n-r-open discipline, the in-profile communication from a network host 114 is allowed (in step 206) regardless of whether the threshold value 'n' has been met.

In step 212, a reverse firewall enforcing a throttling discipline on the network communication at issue may use, among other things, the out-of-profile counter to determine whether to block (or allow) the network communication. For example, a reverse firewall enforcing a n-r-relaxed discipline with a 'n' value of 10 and 'r' value of 60 seconds may block (in step 214) all future network communication, including both in-profile and out-of-profile communication, from an internal source host after the TD for that internal source host has been reached. In that example, even if the network communication is in the profile of the internal source host in step 204, the network communication may be blocked (i.e., step 214 may be performed instead of step 206). The out-of-profile counter in this example may contain a flag (e.g., boolean variable) for indicating a blocked state or allow state. In some embodiments, all network communication from an internal source host will continue to be blocked until a network administrator (or equivalent) resets the out-of-profile counter. In another embodiment, the out-of-profile counter may automatically reset after a predetermined amount of time (i.e., block time interval) has elapsed (e.g., 20 minutes). In yet another embodiment, the user of the blocked internal source host may be able to manually reset the out-of-profile counter. One skilled in the art will appreciate that there are various techniques for blocking (in step 214) network communication from an internal host. For example, a reverse firewall may simply refuse to forward (i. e., drop) certain packets to their destination. In another example, address resolution protocol (ARP) may be used to modify mappings stored in tables used by the internal source host to effectively block the appropriate communication from the internal source host.

FIG. 4 illustrates a simplified diagram of a portion of a memory unit 400 in a reverse firewall located on a network 102 in accordance with various aspects of the invention. The memory unit 400 may comprise volatile and/or non-volatile memory. The memory unit 400 may store a set of rules 404, 406 corresponding to the profile of a host 114 in the network 102. The memory unit 400 may be part of a network device (e.g., router 112, conventional firewall 104, computing device 120) configured to enforce a profile of a host 114 in a network 102. The same network device may also be configured to enforce a throttling discipline in accordance with various aspects of the invention. For example, the network device may comprise a programmable router (e.g., router 112) configured as a reverse firewall. One skilled in the art will appreciate that the memory unit 400 need not necessarily be physically located in a network device. Rather, in accordance with aspects of the invention, the network device may simply access the memory unit to identify the set of rules corresponding to the profile of the host in the network.

In the illustrative embodiment in FIG. 4, the profile 402 of an internal host may comprise PCSPP rules (i.e., a 3-tuple rule defined by protocol, client, server port, and server profile), PCSP rules (i.e., a 3-tuple rule defined by protocol, client, and server profile), PSP rules (i.e., a 2-tuple rule defined by protocol and server profile), and/or PSSP rules (i.e., a 3-tuple rule defined by protocol, server port, and server profile). One skilled in the art will appreciate that other combinations of information about internal host communication, including but limited to source IP address, destination IP address, destination port number, and communication protocol, may be used for other types of rules. A reverse firewall (e.g., router 112) with a profile of a host 114 comprising a PCSPP rule 404 may use that rule 404 to control network communication sent from an internal source host 114 in the network 102. For example, a reverse firewall receiving network communication from a host 114 with an IP address of 1.1.182.1 may allow the communication if the internal destination host's IP address is 1.1.182.2 and is occurring on port 80 using TCP because that network communication is in the profile of the source host 114. Similarly, a reverse firewall receiving network communication from a host 114 may allow the communication if the destination host's IP address is 1.1.182.2 and is occurring using UDP because that rule 406 defines that network communication to be in the profile of the source host 114. In that example, the profile 402 of the host 114 contained a PCSP rule 406 where the destination port of the communication was not a factor in determining whether the communication was in-profile or out-of-profile. Meanwhile, a PSP rule 408 applies to the profile of all source hosts directed at a given destination host (e.g., host 118 with an IP address of 1.1.182.3). Furthermore, a reverse firewall receiving a network communication from a host 114 may allow the communication to pass if the destination host's IP address is 1.1.182.2 and is occurring using TCP on port 21 because rule 414 defines that network communication to be in the profile of the source host 114.

A network device configured to enforce a throttling discipline may be coupled to an out-of-profile counter 410. The out-of-profile counter 410 may be used to enforce the throttling discipline. The out-of-profile counter 410 may comprise a number and a timer. In other words, the out-of-profile counter 410 may comprise memory for storing the number of out-of-profile communications sent from an internal host 114 and circuitry or computer-executable instructions for use as a clock timer. For example, in a network 102 comprising a reverse firewall (e.g., router 112) and two internal hosts 114, 116 connected to a network device 112, a memory unit 400 may stored an out-of-profile counter 410 may be provided for each of the hosts 114, 116. In enforcing a throttling discipline, the reverse firewall may use the out-of-profile counter to determine whether the threshold level has been reached. One skilled in the art will recognize that an out-of-profile counter in accordance with aspects of the invention may comprise other features, including, but not limited to, a second clock timer for determining when a block time interval, as described earlier, has elapsed.

Figure 5:
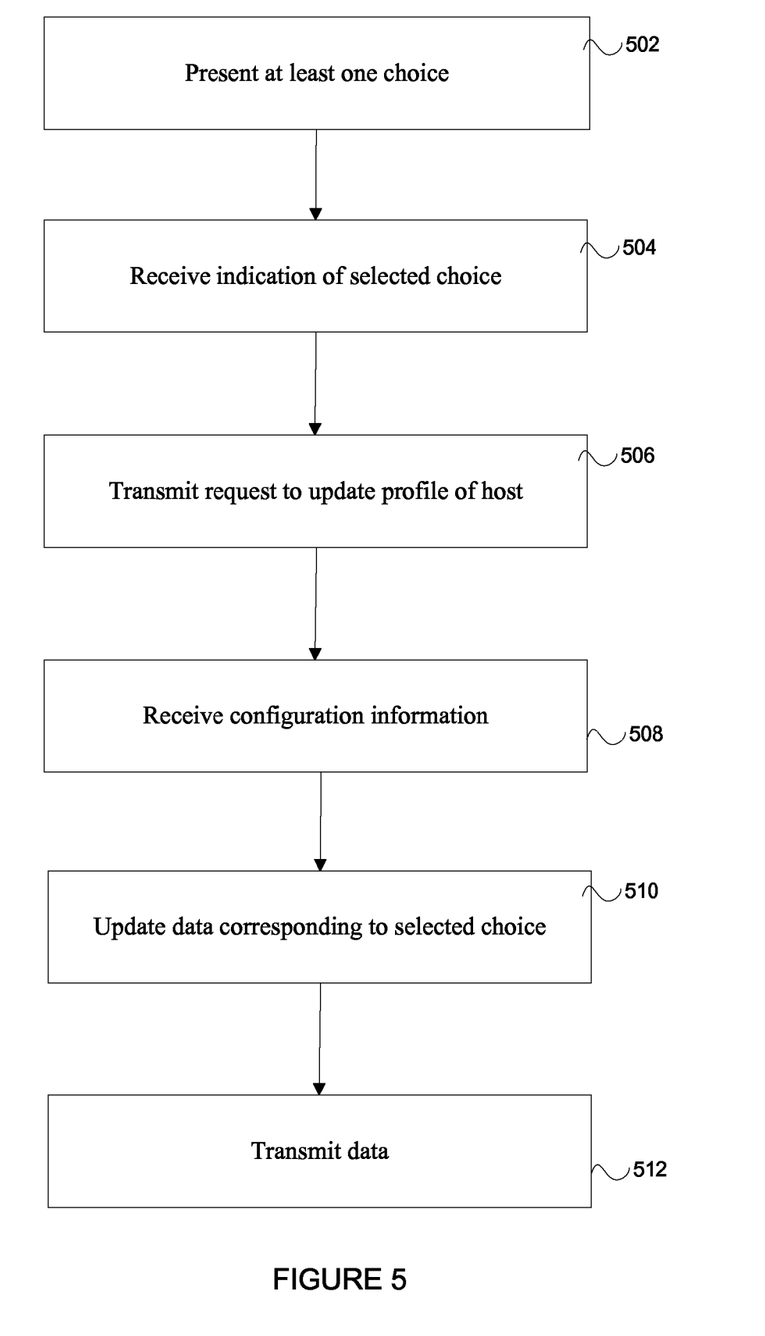
FIG. 5 illustrates a flowchart of a method for managing a profile of a host in accordance with various embodiments of the invention.

FIG. 5 illustrates a method for managing a profile of a host in accordance with various embodiments of the invention. For example, illustrative computing device (e.g., provisioning server 118) may present (in step 502) at least one application choice to a user. The application choices may be desktop software applications, such as Microsoft Word™, Microsoft Outlook™, Microsoft Excel™, Adobe Acrobat™, Wordperfect, and other software applications. The choice of specific applications may be presented in consideration of classes of applications to particular hosts and/or users. Various security policies may be used to determine which applications belong to a particular host, user, and/or host/user group.

The user may select one or more application choices, and the computing device 118 may receive an indication of the selected application(s). For example, the computing device 118 may receive (in step 504) a "1" to indicate Microsoft Word™, a "2" to indicate Wordperfect, etc. One skilled in the art will appreciate that other techniques for indicating a selection are available in accordance with aspects of the invention. Furthermore, in another embodiment, the illustrative computing device 118 may receive (in step 504) an indication of a selected application without having presented (in step 502) application choices to a user. For example, in a networked environment, a host computer 120 may be configured with client-side software that presents application choices to a user and transmits the requests to illustrative computing device 118. Thus, computing device 118 may receive an indication of a selected choice without having first presented choices. One skilled in the art will appreciate that one or more steps illustrated in the flowchart of FIG. 5 may be optional, and the order of the steps depicted in the flowchart illustrate merely one embodiment in accordance with aspects of the invention.

After receiving an indication of a selected application, the illustrative computing device 118 may transmit (in step 506) a request to update a profile of a host to reflect configuration information of the selected application. The profile of the host may be configured for use with a reverse firewall device 104. The reverse firewall device may determine whether to allow or block a particular communication from the host, as explained in greater detail above. The profile of the host may be stored locally at the computing device 118, or may be stored in memory at the host or at other remote memory locations. The request transmitted may comprise executable commands or other commands/instructions to cause the profile of a host to be modified/updated to reflect the desired configuration information. In an alternate embodiment, the profile of a host may be empty, thus the request to update the profile of the host may cause the profile to be newly populated with information in accordance with aspects of the invention.

In step 508, illustrative computing device 118 may receive configuration information. For example, in a networked environment, a host computer 120 may be configured with client-side software that presents forms (e.g., HTML forms, drop-down boxes, text boxes, etc.) to a user (e.g., an employee, a contractor, an administrator, any authorized person, etc.) to permit the user to designate configuration information for the selected application(s). For example, a user may enter an IP address of 177.143.12.8 as configuration information to designate the machine running an SMTP server servicing Microsoft Outlook™ installations on the network. When this information is receiving at illustrative computing device 118, the device may update data that corresponds to the selected application (e.g., Microsoft Outlook™) to reflect the received configuration information. In an alternate embodiment, the configuration information may be predetermined configuration information. The predetermined configuration information may be configuration information that was previously designated and stored in a memory location accessible to the illustrative computing device 108. For example, an administrator may set default configuration information for installations of particular applications, thus configuration information need not necessarily be provided be a lay user attempting to install software (or a software patch/update) on a host computer.

In step 510, data that corresponds to the selected application may be updated to reflect the configuration information. In some applications, a configuration file (e.g., a text file containing application settings, etc.) is updated to reflect the configuration information. The configuration information may be used to ensure that a desired security policy is implemented. In one example, the provisioning server 118 may be used to perform all or part of step 510.

In step 512, the data corresponding to the selected application is transmitted. The data may be transmitted using wired or wireless means, such as Ethernet, IEEE 802. 11a/b/g, and/or modem. In an embodiment, the data is transmitted from a provisioning server 118 to a host computer where it is used to install the selected application on the host computer. Once installed, the application may operate and communicate with other internal and external hosts per its updated host profile.

After through review of the entire disclosure, it will become apparent to one skilled in the art that there are numerous practical applications for various aspects of the invention. For example, a computer-readable medium containing computer-executable instructions for performing the method diagrammed in the flowcharts of FIGS. 2, 3, and 5 is contemplated by the aforementioned disclosure. The computer-executable instructions may be executed by a processing unit in a reverse firewall or any other device configured to behave accordingly. The usefulness of aspects of the invention in such a context is apparent to one skilled in the art.

The use of the term "connect" and similar referents in the context of describing aspects of the invention, especially in the context of the following claims, is not to be construed to require a physical connection or direct connection. Furthermore, the terms "comprising," "having," "including," and "containing" are to be construed as open-ended terms (meaning "including, but not limited to,") unless otherwise noted. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Various aspects of the invention have been described in terms of exemplary or illustrative embodiments thereof. Numerous other embodiments, modifications and variations within the scope and spirit of the appended claims will occur to persons of ordinary skill in the art from a review of this disclosure and any disclosures incorporated by reference herein.

We claim:
1. An apparatus comprising:
    a memory having an application program stored in the memory;
    a computer coupled to the memory, the application program when executed on the computer causing the computer to perform operations comprising:
    receive an indication of a selected application of a computing device;
    to transmit a request to update a profile of a host to reflect configuration information related to the selected application;
    to modify the profile for use with a reverse firewall device;
    to determine a rate of communications from the host attributable to the selected application that are unauthorized based on the profile, the rate of communications being computed as a ratio of a number of message units per unit of time; and to use the reverse firewall device to determine whether to block a particular communication from the host based on the rate of communications from the host that are unauthorized based on the profile.

2. A method, comprising:
receiving an indication of a selected application of a computing device;
transmitting a request to update a profile of a host to reflect configuration information related to the selected application;
configuring the profile for use with a reverse firewall device;
determining a rate of communications from the host attributable to the selected application that are unauthorized based on the profile, the rate of communications being computed as a ratio of a number of message units per unit of time; and
using the reverse firewall device to determine whether to block a particular communication from the host based on the rate of communications from the host that are unauthorized based on the profile.

3. The method of claim 2 further comprising configuring the reverse firewall device to use a throttling discipline and out-of-profile counter to determine whether to block the particular communication from the host.

4. The method of claim 2, further comprising presenting at least one application, the at least one application comprising the selected application.

5. The method of claim 2 including transmitting a request to update the profile while the profile is empty of configuration information before transmitting a request to update the profile of the host.

6. The method of claim 2 including, the configuration information comprising information indicating an internal host that the selected application is configured to access.

7. The method of claim 2, further comprising:
updating data that corresponds to the selected application to reflect the configuration information, wherein the configuration information is predetermined configuration information; and
transmitting the data that corresponds to the selected application.

8. The method of claim 2, further comprising:
receiving the configuration information;
updating data that corresponds to the selected application to reflect the configuration information; and
transmitting the data that corresponds to the selected application.

9. An apparatus, comprising:
a processor that executes instructions;
a memory coupled to the processor and configured to store data corresponding to a selected application that comprises the instructions, the instructions when executed by the processor causing the processor to perform operations comprising:
presenting at least one application choice for download to a host, receive an indication of the selected application for download to the host,
transmitting data that corresponds to the selected application, and
transmitting a request to update a profile of the host to reflect configuration information of the selected application, the updated profile indicating whether to block a particular communication from the host; and
a reverse firewall device to determine a rate of communications from the host attributable to the selected application that are unauthorized based on the profile, the rate of communications being computed as a ratio of a number of message units per unit of time, and to determine whether to block the particular communication from the host based on the rate of communications from the host that are unauthorized based on the profile.

10. The apparatus of claim 9, wherein the reverse firewall device is further to apply a throttling discipline to communication from the host based on the profile, the apparatus further comprising:
an out-of-profile counter to generate a count of out-of-profile communications from the host, the reverse firewall device being further to determine whether to block the particular communication from the host based on the count of out-of-profile communications from the host.

11. The apparatus of claim 9, the configuration information being predetermined configuration information.

12. The apparatus of claim 9, wherein the operations further comprise:
receive the configuration information, and update the data that corresponds to the selected application to reflect the received configuration information.

13. A non-transitory computer-readable medium comprising instructions which, when executed by a computing device, cause the computing device to perform operations comprising:
receiving an indication of a selected application for downloading to a host;
transmitting data that corresponds to the selected application to the host; configure the profile for use with a reverse firewall device;
determining a rate of communications from the host attributable to the selected application that are unauthorized based on the profile, the rate of communications being computed as a ratio of a number of message units per unit of time; and
using the reverse firewall device to determine whether to block a particular communication from the host based on the rate of communications from the host that are unauthorized based on the profile.

14. The non-transitory computer-readable medium of claim 13, wherein the configuration information is predetermined configuration information.

15. The non-transitory computer-readable medium of claim 13, wherein the operations further comprise:
receiving the configuration information and update data that corresponds to the selected application to reflect the received configuration information.

16. The non-transitory computer-readable medium of claim 13, wherein the profile comprises a 4-tuple rule defined by protocol, client, server port, and server profile.

17. The non-transitory computer-readable medium of claim 13, wherein the profile comprises a 3-tuple rule defined by protocol, client, and server profile.

18. The non-transitory computer-readable medium of claim 13, wherein the profile comprises a 2-tuple rule defined by protocol and server profile.

19. The non-transitory computer-readable medium of claim 13, wherein the profile comprises a 3-tuple rule defined by protocol, server port, and server profile.

* * * * *